United States Patent
Jain et al.

(10) Patent No.: US 10,123,225 B1
(45) Date of Patent: Nov. 6, 2018

(54) TIME OF DAY-TRIGGERED USAGE MONITORING

(71) Applicant: Juniper Networks, Inc., Sunnyvale, CA (US)

(72) Inventors: Ashish Jain, Bangalore (IN); Anand Narayanan Rao, Bangalore (IN); Prasad Chigurupati, Bangalore (IN); Jegan Kumar Somi Ramasamy Subramanian, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 14/869,273

(22) Filed: Sep. 29, 2015

(51) Int. Cl.
*H04W 24/08* (2009.01)
*H04L 12/26* (2006.01)

(52) U.S. Cl.
CPC .......... *H04W 24/08* (2013.01); *H04L 43/062* (2013.01); *H04L 43/0894* (2013.01)

(58) Field of Classification Search
None
See application file for complete search history.

(56) References Cited

U.S. PATENT DOCUMENTS

| | | | |
|---|---|---|---|
| 2006/0008063 A1* | 1/2006 | Harnesk | H04L 12/14 379/114.01 |
| 2011/0208853 A1* | 8/2011 | Castro-Castro | H04L 12/14 709/223 |
| 2012/0144049 A1* | 6/2012 | Lopez Nieto | H04L 12/14 709/228 |
| 2012/0224538 A1* | 9/2012 | Stenfelt | H04M 15/00 370/328 |
| 2012/0233324 A1* | 9/2012 | Zhou | H04L 12/14 709/224 |
| 2012/0259747 A1* | 10/2012 | Bystrom | H04L 47/72 705/30 |
| 2013/0132570 A1* | 5/2013 | Lopez Nieto | H04L 41/0893 709/224 |

(Continued)

OTHER PUBLICATIONS

"3GPP TS 23.203—Policy and Charging Control Architecture (Release 13)," Version 114.0, 3rd Generation Partnership Project, Technical Specification Group Services and System Aspects, Jun. 2015, 235 pp.

(Continued)

*Primary Examiner* — Kodzovi Acolatse
(74) *Attorney, Agent, or Firm* — Shumaker & Sieffert, P.A.

(57) ABSTRACT

In general, this disclosure describes usage monitoring techniques. In one example, a method comprises storing, by a monitoring device that performs usage monitoring for at least one packet flow that traverses an access network by which subscriber devices access a packet data network, data indicating an amount of unused granted service units for the at least one packet flow that is unused as of a policy rule deactivation time for one or more policy rules matched by the at least one packet flow. The monitoring device further reactivates the usage monitoring for the at least one packet flow at a policy rule reactivation time for the one or more policy rules matched by the at least one packet flow based on an updated amount of granted service units, wherein the updated amount of granted service units are based on the data indicating the amount of unused granted service units.

20 Claims, 6 Drawing Sheets

(56) References Cited

U.S. PATENT DOCUMENTS

| | | | |
|---|---|---|---|
| 2014/0187195 A1* | 7/2014 | Pallares Lopez ... | H04L 12/1432 455/405 |
| 2014/0187199 A1* | 7/2014 | Yan ................. | H04W 48/02 455/410 |
| 2015/0295724 A1* | 10/2015 | Rasanen ............ | H04L 43/16 370/259 |
| 2015/0341503 A1* | 11/2015 | Chandramouli .... | H04L 12/1407 455/405 |

OTHER PUBLICATIONS

"3GPP TS 29.212—Policy and Charging Control (PCC), Reference Points (Release 13)," Version 13.2.0, 3rd Generation Partnership Project, Technical Specification Group Core Network and Terminals, Jun. 2015, 228 pp.

"3GPP TS 32.299—Telecommunication management, Charging management, Diameter charging applications (Release 13)," Version 13.1.0, 3rd Generation Partnership Project, Technical Specification Group and System Aspects, Jun. 2015, 176 pp.

* cited by examiner

| Reporting-Reason | Time of Day Deactivation |
|---|---|
| Tariff-Change-Usage | [ value ] |
| CC-Time | [ value ] |
| CC-Total-Octets | [ value ] |
| CC-Input-Octets | [ value ] |
| CC-Output-Octets | [ value ] |
| CC-Service-Specific-Units | [ value ] |
| Event-Charging-TimeStamp | [ value ] |

TIME OF DAY-TRIGGERED USAGE MONITORING

TECHNICAL FIELD

The disclosure relates to computer networks and, more specifically, to applying network services to subscriber data traffic traversing computer networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile access networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (Wi-MAX) forum.

A typical 3GPP mobile access network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

SUMMARY

In general, this disclosure describes techniques related to reducing control traffic exchanged between a policy control server device (which may implement a policy and charging rules function (PCRF)) for an access network and a monitoring device (which may implement a policy and charging enforcement function (PCEF) within a traffic detection function (TDF) or a PDN gateway (PDN GW)) for the access network.

In some examples of the described techniques, the monitoring device may receive, from the policy control service device, one or more policy (e.g., PCC/ADC) rules with a rule deactivation time and a usage monitoring key. The monitoring device accumulates the usage until the specified rule deactivation time. Upon reaching the rule deactivation time, the monitoring device ceases usage monitoring. If the accumulated usage is less than the granted quota (or "granted service units"), the monitoring device may store the remaining quota and subsequently reactivate, at a specified reactivation time, usage monitoring using the stored remaining service units as the number of service units for the subsequent usage monitoring. In some examples, the monitoring device reports the accumulated usage along with an indication that the deactivation of the rule is responsive to the time of day-triggered rule deactivation.

The techniques may provide one or more advantages. For example, by automatically reactivating a deactivated usage monitoring using a stored remaining service units for the at least one packet flow, the monitoring device may avoid a requirement that the policy control server device reinitiate usage monitoring. At least in some instances, because the monitoring device uses the stored remaining service units for the reactivated usage monitoring, the subsequent usage is commensurate with the expected service units that would otherwise be initiated by the policy control server device. As a result, the techniques may reduce an amount of control traffic between the policy control server device and the monitoring device for usage monitoring of packet flows.

In one example, a method comprises storing, by a monitoring device that performs usage monitoring for at least one packet flow that traverses an access network by which subscriber devices access a packet data network, data indicating an amount of unused granted service units for the at least one packet flow that is unused as of a policy rule deactivation time for one or more policy rules matched by the at least one packet flow. The monitoring device further reactivates the usage monitoring for the at least one packet flow at a policy rule reactivation time for the one or more policy rules matched by the at least one packet flow based on an updated amount of granted service units, wherein the updated amount of granted service units are based on the data indicating the amount of unused granted service units.

In another example, a method comprises installing, by a policy server to a monitoring device, a policy rule for monitoring usage of granted service units by at least one packet flow that traverses an access network within a policy domain of the policy server and by which subscriber devices access a packet data network. The policy server further receives, from the monitoring device, a first usage reporting message. The policy server waits, in response to determining the first usage reporting message indicates a reason for the first usage reporting message as time of day deactivation of the policy rule, for a second, subsequent usage reporting message from the monitoring device. The policy server further sends, to the monitoring device in response to receiving the second usage reporting message, additional granted service units for the monitoring usage of granted service units usage by the at least one packet flow.

In another example, a network device comprises a control unit comprising a processor, one or more policy rules matched by at least one packet flow that traverses an access network by which subscriber devices access a packet data network, and a monitoring module executed by the control unit. The monitoring module is configured to perform usage monitoring for the at least one packet flow. The monitoring module is further configured to store data indicating an amount of unused granted service units for the at least one packet flow that is unused as of a policy rule deactivation time for one or more policy rules matched by the at least one packet flow. The monitoring module also reactivates the usage monitoring for the at least one packet flow at a policy rule reactivation time for the one or more policy rules matched by the at least one packet flow based on an updated amount of granted service units, wherein the updated amount of granted service units are based on the data indicating the amount of unused granted service units.

In another example, a policy server comprises a control unit comprising a processor and a rule module executed by the control unit. The rule module is configured to install, to a monitoring device, a policy rule for monitoring usage of granted service units by at least one packet flow that traverses an access network within a policy domain of the policy server and by which subscriber devices access a packet data network. The rule module is further configured to receive, from the monitoring device, a first usage reporting message. The rule module is also configured to wait, in response to determining the first usage reporting message indicates a reason for the first usage reporting message as time of day deactivation of the policy rule, for a second, subsequent usage reporting message from the monitoring device. The rule module is further configured to send, to the monitoring device in response to receiving the second usage reporting message, additional granted service units for the monitoring usage of granted service units usage by the at least one packet flow.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1A:
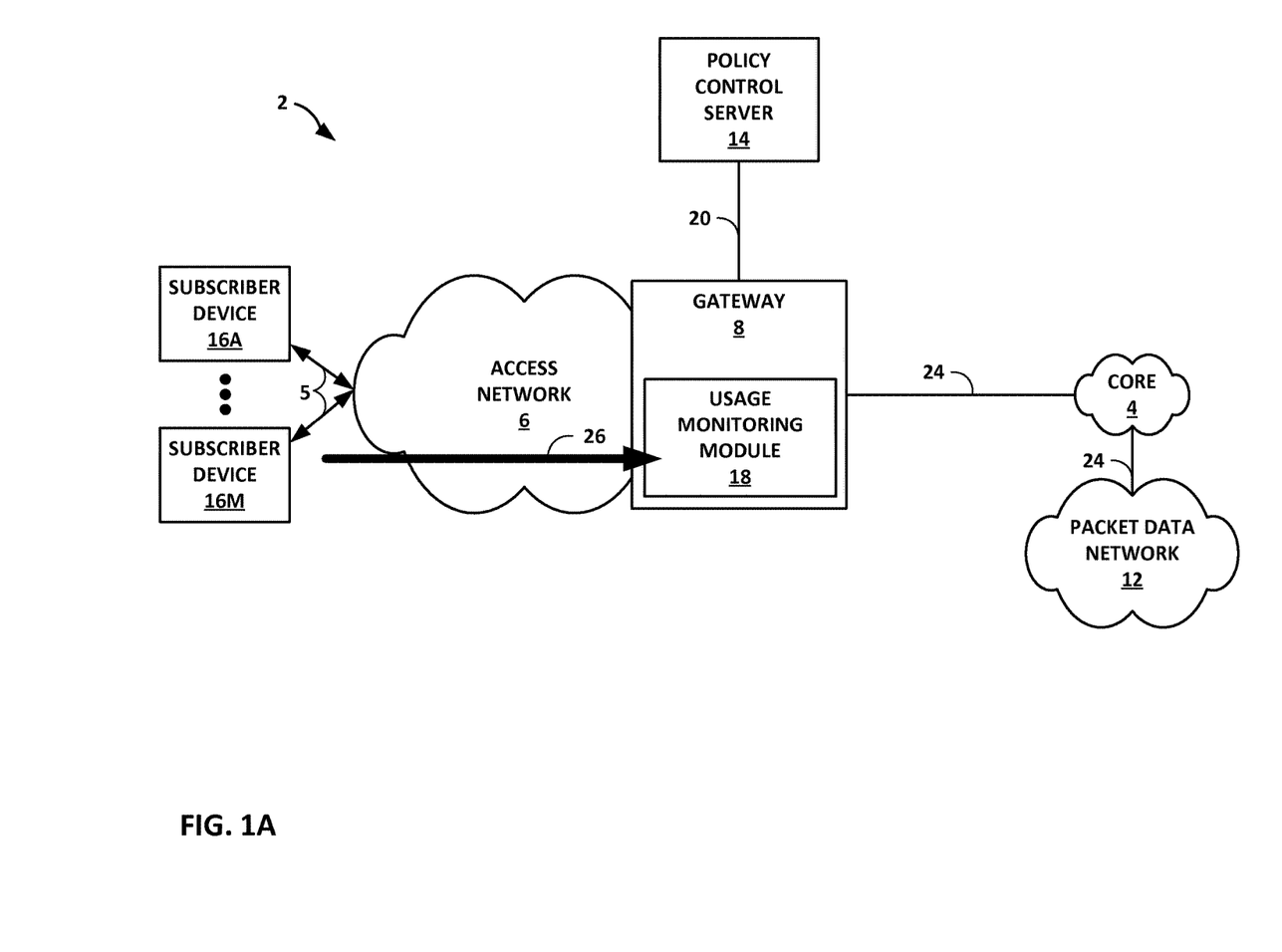
FIGS. 1A-1B are block diagrams each illustrating an example network system in which a policy control server and a monitoring device cooperatively performing usage monitoring by packet flows, according to techniques described in this disclosure.
Figure 1B:
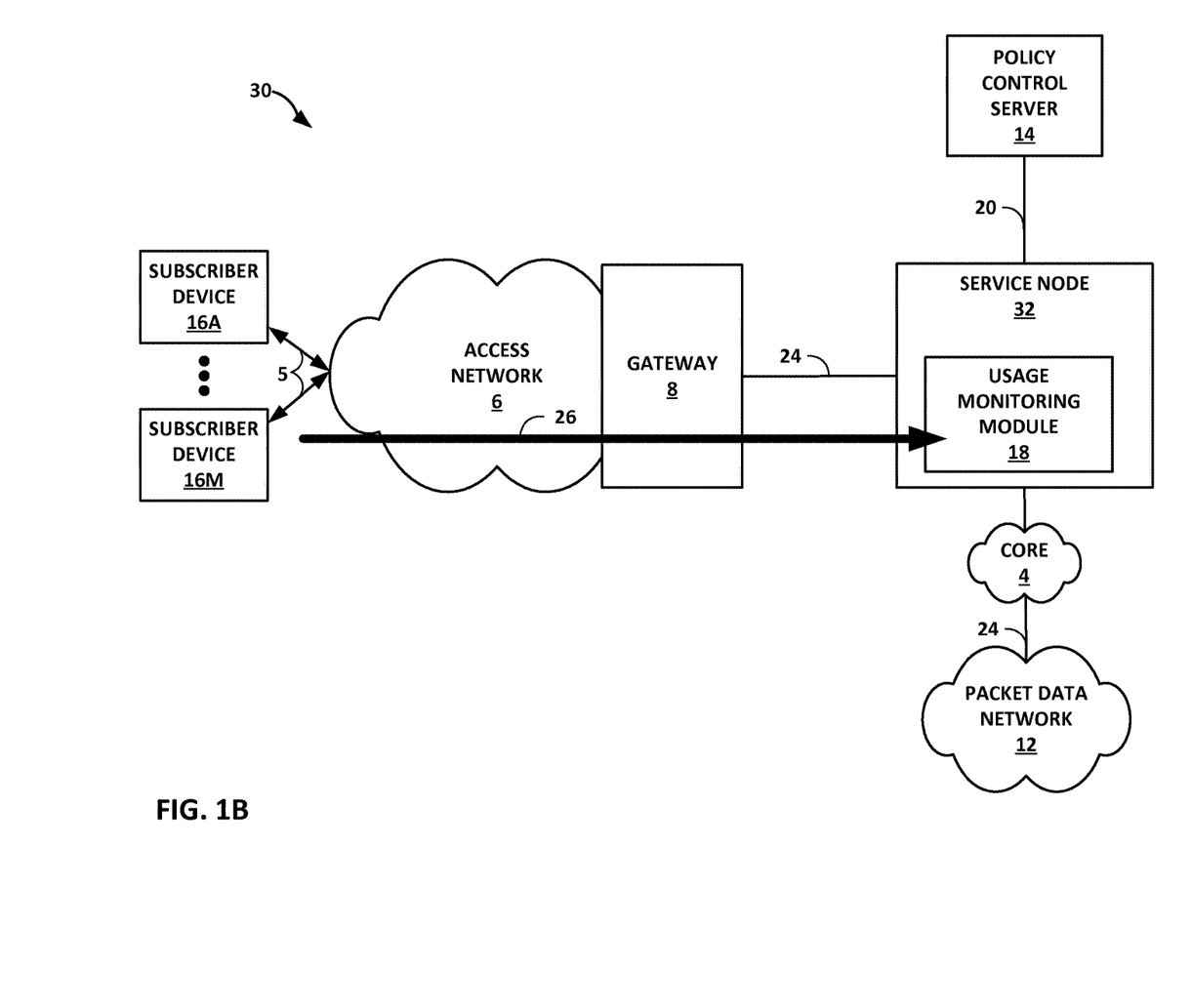

FIGS. 1A-1B are block diagrams each illustrating an example network system in which a policy control server and a monitoring device cooperatively performing usage monitoring by packet flows, according to techniques described in this disclosure. Network system 2 of FIG. 1A and network system 30 of FIG. 1B each includes packet data network (PDN) 12 coupled to service provider access network 6 ("access network 6") via access network gateway device 8 ("gateway 8") for access network 6. Packet data network 12 supports one or more packet-based services that are available for request and use by subscriber devices 16A-16M (collectively, "subscriber devices 16"). As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. Applications hosted by subscriber devices 16 may include VoIP clients, video games, videoconferencing, E-mail, and Internet browsers, among others. Each of subscriber devices 16 may represent, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by PDN 12. A subscriber may represent, for instance, an enterprise, a residential subscriber, or a mobile subscriber. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from core network 4 (illustrated as "core 4" in FIGS. 1A-1B) of the service provider. Access network 6 includes network nodes (not shown) that execute communication protocols to transport control and user data to facilitate communication between subscriber devices 16 and gateway 8. Access network 6 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), 3$^{rd}$ Generation Partnership Project 2 (3GGP/2) and the Worldwide Interoperability for Microwave Access (WiMAX) forum.

Service provider core network 4 (hereinafter, "core network 4") offers packet-based connectivity to subscriber devices 16A-16M attached to access network 6 for accessing PDN 12. Core network 4 may represent a public network that is owned and operated by a service provider to interconnect a plurality of networks, which may include access network 6. Core network 4 may implement Multi-Protocol Label Switching (MPLS) forwarding and in such instances may be referred to as an MPLS network or MPLS backbone. In some instances, core network 4 represents a plurality of interconnected autonomous systems, such as the Internet, that offers services from one or more service providers. PDN 12 may represent an edge network coupled to core network 4, e.g., by a customer edge device such as customer edge switch or router. PDN 12 may include a data center.

In examples of network system 2, 30 that include a cellular access network as access network 6, gateway 8 may represent a mobile gateway, for example, a Gateway General Packet Radio Service (GPRS) Serving Node (GGSN), an Access Gateway (aGW), and/or a Packet Data Network (PDN) Gateway (PGW). In examples of network systems 2, 30 that include a wireline/broadband access network, gateway 8 may represent a Broadband Services Router (BSR), Broadband Network Gateway (BNG), business provider edge (PE) router, and/or a Broadband Remote Access Server (BRAS), for instance. Interface 24 may represent a Gi and/or SGi interface (or "reference point"). Consequently, elements of core network 4 may be referred to as an SGi-LAN and/or Gi-LAN.

A network service provider that administers at least parts of network system 2 offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 4 may support multiple types of access network infrastructures that connect to service provider network access gateways to provide access to the offered services. In some instances, network system may include subscriber devices 16 that attach to multiple different access networks 6 having varying architectures yet all coupled by interface 24 to PDN 12.

In the example of FIG. 1A, gateway 8 is a network device that performs policy and charging control (PCC) functionality for access network 6. In the example of FIG. 1B, service node 32 is a network device that performs the PCC functionality for access network 6. Gateway 8 and service node 32 each represent examples of monitoring devices that perform usage monitoring for flows 26 (and downstream flows).

Policy control server 14 represents one or more computing devices that provision gateway 8 and/or service node 32 by policy interface 20 with one or more policy rules that each specifies a set of information enabling the detection of a service data flow and defining usage monitoring parameters for application by gateway 8 and/or service node 32. Policy rules may further define policy control, charging, or application detection parameters for application by gateway 8 and/or service node 32. Policy control server 14 may represent, for instance, a Policy Control and Charging Rules Function (PCRF) for a mobile (e.g., 3GPP) or convergent instance of access network 6 or, alternatively or in addition, a Policy Decision Point (PDP) for a Broadband Policy Control Framework (BPCF) framework for a broadband/wireline instance of access network 6.

In the example of FIG. 1A, usage monitoring module 18 of gateway 8 performs flow-based usage monitoring according to the policy rules. Usage monitoring module 18 represents a device, module, component, software library, or combination of the above that applies usage monitoring for access network 6 in accordance with the policy rules provided by policy control server 14. Usage monitoring module 18 may in some instances be executed by a device separate from gateway 8. For instance, in the example of FIG. 1B, service node 32 includes usage monitoring module 18 to perform flow-based usage monitoring according to the policy rules.

In the example network system 30 of FIG. 1B, service node 32 controls the service application to packet flows 26. Service node 32 may operates as a gateway for a services complex to anchor the delivery of dynamic service selection and application to packet flows. Service node 32 may perform traffic detection, policy enforcement, and service steering, as well as usage monitoring according to techniques described herein. Service node 32 may provide subscriber-aware, device-aware, and/or application-aware traffic detection and granular traffic steering functionality with policy interfaces. Service node 32 may include integrated L4-L7 deep packet inspection (DPI), for instance. Service node 32 may in some cases be combined with other embedded networking functions (such as carrier-grade NAT and firewall/load balancer) to consolidate components of a services complex into a single network element.

Service node 32 may represent is a physical gateway router or switch that connects virtual networks of a services complex to physical networks such core network 4, the Internet, a customer VPN (e.g., L3VPN), another data center, or to non-virtualized servers. In such examples, a services complex may include layer two (L2) and layer three (L3) switching and routing components that provide point-to-point connectivity between servers (not shown) that execute one or more of services nodes within a virtual environment. That is, one or more of services nodes may run as virtual machines in a virtual compute environment. Moreover, the compute environment may comprise a scalable cluster of general computing devices, such as x86 processor-based servers. As another example, services nodes may comprise a combination of general purpose computing devices and special purpose appliances. In some examples, service node 32 represents a server, process, virtual machine, or controller executing within services complex.

Policy interface 20 may represent a Gx and/or Sd interface/reference point. In some instances, the policy rules provided by policy control server 14 to gateway 8 include PCC rules and usage monitoring module 18 represents a Policy and Charging Enforcement Function (PCEF). In some instances, the policy rules may also or alternatively include Application Detection and Control (ADC) rules and usage monitoring module 18 represents a Traffic Detection Function (TDF) and/or a PCEF. In some instances, usage monitoring module may represent a Policy Decision Point for a BPCF framework. Further details regarding policy and charging controls are found in "3GPP TS 23.203—Policy and Charging Control Architecture (Release 13)," Version 13.4.0, 3rd Generation Partnership Project, Technical Specification Group Services and System Aspects, June 2015; and 3GPP TS 29.212—Policy and Charging Control (PCC), Reference Points (Release 11)," Version 13.2.0, June 2015, which are each incorporated herein by reference in their entirety.

Any one or more of subscriber devices 16 may begin sending subscriber data traffic toward core network 4 in order to access and receive services provided by PDN 12, and such packets traverse gateway 8 as part of at least one packet flow. Flows 26 illustrated in FIGS. 1A-1B represent one or more packet flows from any one or more subscriber devices 16 and directed to PDN 12. The term "packet flow," "traffic flow," or simply "flow" refers to a set of packets originating from a particular source device and sent to a particular destination device as part of a communication session between the source and destination device. A flow of packets, in either the upstream (sourced by one of subscriber devices 16) or downstream (destined for one of subscriber devices 16) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Subscriber devices 16 also receive downstream flows (not shown for ease of illustration purposes) from PDN 12.

Usage monitoring module 18 applies usage monitoring for determining and reporting of the accumulated usage of network resources, according to usage parameters granted by the policy control server 14. In addition, the policy control server 14 may control the activation and deactivation of usage monitoring using policy rule (e.g., PCC or ADC) time of day procedures, in which the policy control server 14 specifies times at which the monitoring device is to activate the policy rule and/or to deactivate the policy rule according to the specified times.

Policy control server 14 implements "time of day" functionality. The time of the day functionality allows policy control server 14 to dynamically activate and/or deactivate the policy (e.g., PCC/ADC) rules associated with a subscriber. In the usage monitoring module 18 (e.g., PCEF/TDF), during subscriber context creation/update the policy control server 14 can give the rule activation time and/or the rule deactivation time for the set of policy rules for which it is applicable. If activation time is received along with a policy rule, then that rule is activated only when the current time is greater than or equal to the activation time. Similarly, the rule is deactivated when the current time is greater than or equal to the deactivation time.

As noted above, usage monitoring module 18 performs usage monitoring control to apply monitoring control for the accumulated usage of network resources on a per-subscriber session basis as well as service data flows/applications and the same is indicated/initiated via messages in policy interface 20 (e.g., the Gx reference point).

In some examples of the described techniques, the usage monitoring module 18 may receive, from policy control server 14, one or more policy rules with a rule deactivation time and a usage monitoring key. Usage monitoring module 18 may accumulate the usage until the specified rule deactivation time. Upon reaching the rule deactivation time, monitoring device deactivates the one or more policy rules and usage monitoring module 18 ceases usage monitoring. For example, policy control server 14 may send a deactivation indication to usage monitoring module 18 at a particular deactivation time as specified in policy rules stored in policy control server 14 as applied to the at least one packet flow.

Usage monitoring module 18 may deactivate the one or more policy rules and corresponding usage monitoring at the specified deactivation time and report the usage accumulated by the at least one packet flow as of the deactivation time. If the accumulated usage is less than the granted service units, the monitoring device may store the remaining service units and subsequently reactivate, at a specified reactivation time, usage monitoring using the stored remaining service units as the service units. In other words, if the at least one packet flow has not exceeded the granted service units, usage monitoring module 18 stores the amount of remaining service units for future reference upon reactivation. In some examples, usage monitoring module 18 reports the accumulated usage along with an indication that the deactivation of the rules is responsive to a time of day deactivation. If the accumulated usage is greater than or equal to the granted service units, then usage monitoring module 18 may store an indication that there are no granted service units remaining for the at least one packet flow. Regardless, in general, usage monitoring module 18 stores data indicating an amount of unused granted service units for the at least one packet flow that is unused at a usage monitoring deactivation time for the at least one packet flow.

Usage monitoring module 18 may further reactivate the one or more policy rules and the corresponding usage monitoring for the at least one packet flow at a reactivation time for the policy rules. The usage monitoring granted service units are based on the data indicating the amount of unused granted service units. For instance, if the stored data indicates that the previously accumulated usage did not exceed the previously granted service units, then usage monitoring module 18 may indicate that the new amount of unused granted service units is equal to the previously granted service units minus the previously accumulated usage. Conversely, at the time of the policy rule reactivation, if the stored data indicates that there are no remaining available service units for the at least one packet flow, the monitoring device may reactivate the policy rules without the usage monitoring key, as there are no remaining granted service units for the at least one packet flow.

The techniques may provide one or more advantages. For example, by automatically reactivating a deactivated usage monitoring using a stored remaining service units for the at least one packet flow, usage monitoring module 18 of the monitoring device (gateway 8 of FIG. 1A and service node 32 of FIG. 1B) may avoid a requirement that the policy control server device reinitiate usage monitoring. At least in some instances, because the usage monitoring module 18 monitoring device uses the stored remaining service units for the reactivated usage monitoring, the subsequent usage is commensurate with the expected service units that would otherwise be initiated by the policy control server 14. As a result, the techniques may reduce an amount of control traffic between the policy control server 14 and the monitoring device for usage monitoring of packet flows.

Figure 2:
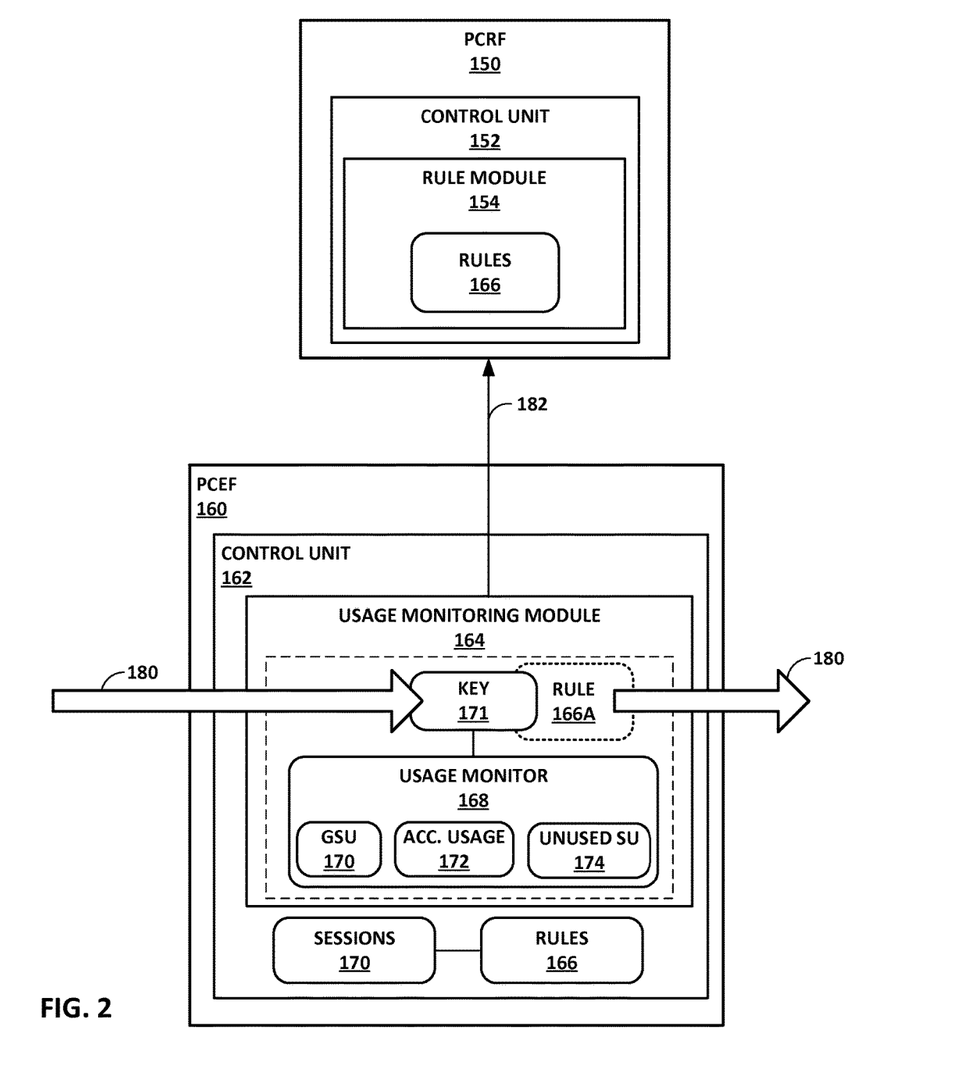
FIG. 2 is a block diagram illustrating a more detailed example of a policy server that monitors usage according to time of day deactivation rules, in accordance with one or more techniques of the current disclosure.

FIG. 2 is a block diagram illustrating a more detailed example of a policy server that monitors usage according to time of day deactivation rules, in accordance with one or more techniques of the current disclosure. In the example of FIG. 2, Policy Control and Rules Function (PCRF) device 150 (hereinafter, "PCRF 150") implements a PCRF. PCRF 150 may represent an example instance of policy control server 14 of FIG. 1.

PCRF 150 may include centralized or distributed control unit 152 that comprises one or more processors (not pictured) and rule module 154. The one or more processors are configured to implement functionality and/or process instructions for execution within PCRF 150. For example, the one or more processors may be capable of processing instructions stored in PCRF 150. Examples of the one or more processors may include, any one or more of a microprocessor, a controller, a digital signal processor (DSP), an application specific integrated circuit (ASIC), a field-programmable gate array (FPGA), or equivalent discrete or integrated logic circuitry. In some examples, control unit 152 may execute rule module 154 as one or more virtual machines executing on underlying hardware of PCRF 150. Rule module 154 may execute as one or more services or components of operating systems or computing platforms of PCRF 150. Rule module 154 may execute as one or more executable programs at application layers of computing platforms of PCRF 150 with operating system privileges or with access to a runtime library of PCRF 150.

Policy Charging and Enforcement Function (PCEF) device 160 (hereinafter, "PCEF 160") may implement a PCEF for a network that transports packet flows. PCEF 160 may represent an example instance of gateway 8 or service node 32. At least in some examples, PCEF 160 is enhanced with Application Detection and Control (ADC). Although described primarily with respect to a PCEF, PCEF 160 may also or alternatively implement a Traffic Detection Function (TDF) that applies techniques described herein for usage monitoring with time of day functionality. PCEF 160 monitors usage and may perform other traffic detection and/or policy enforcement functions for sessions 170 in accordance with policy rules 166.

Each of sessions 170 may represent and be alternatively referred to as a "subscriber session," "PCEF session," "IP session," "IP Connectivity Access Network (IP-CAN) session," for a subscriber for a network for which PCEF 160 performs PCEF and/or TDF. Accordingly, policy rules 166 may represent PCC and/or ADC rules statically and/or dynamically provisioned. ADC may inspect application layer data of packet flows using, e.g., Deep Packet Inspection (DPI). Each of the policy rules 166 may include information for identifying the rule, identifying service data flows that match the rules, for detecting the start and stop of one or more applications executed by subscriber devices, and may also include enforcement actions to be taken by PCEF 160 with respect to matching packet flow data. Enforcement actions may include, e.g., usage monitoring, blocking, policing, and rate limiting. Usage monitoring may include time-based usage and/or data quantity-based monitoring.

PCEF 160 may include centralized or distributed control unit 162 that comprises one or more processors (not pictured) and usage monitoring module 164. The one or more processors are configured to implement functionality and/or process instructions for execution within PCEF 160. For example, the one or more processors may be capable of processing instructions stored in PCEF 160. Examples of the one or more processors may include, any one or more of a microprocessor, a controller, DSP, ASIC, FPGA, or equivalent discrete or integrated logic circuitry. In some examples, control unit 162 may execute usage monitoring module 164 as one or more virtual machines executing on underlying hardware of PCEF 160. Usage monitoring module 164 may execute as one or more services or components of operating systems or computing platforms of PCEF 160. Usage monitoring module 164 may execute as one or more executable programs at application layers of computing platforms of PCEF 160 with operating system privileges or with access to a runtime library of PCEF 160. Further description of the structures and functions illustrated in FIG. 2 can be seen in 3GPP TS 29.212, incorporated by reference above.

According to 3GPP TS 29.212, incorporated above, PCEF 160 may request a rule as instructed by PCRF 150. To do so, PCRF 150 may provide the Event-Trigger Attribute-Value Pair (AVP) with the value REVALIDATION_TIMEOUT if the event trigger is not previously set and in addition the Revalidation-Time AVP when set by PCRF 150. This may cause PCEF 160 to trigger a PCRF interaction to request PCC rules from PCRF 150 for an established session of sessions 170. PCEF 160 may stop the timer once PCEF 160 triggers an REVALIDATION_TIMEOUT event. PCEF 160 may send the PCC rule request during a preconfigured period before the indicated revalidation time. PCRF 150 is expected to be prepared to provide a new policy, as desired for the revalidation time, during a preconfigured period before the revalidation time. The preconfigured periods in PCEF 160 and PCRF 150 may be aligned.

PCRF 150 may provide a new value for the revalidation timeout by including Revalidation-Time AVP in a RADIUS Credit-Control-Answer (CCA) or Diameter Reauthorization Request (RAR). PCRF 150 may provide the Revalidation-Time AVP together with the event trigger REVALIDATION_TIMEOUT or in a subsequent PCC rule provisioning. PCRF 150 may be able to stop the revalidation timer by disabling the REVALIDATION_TIMEOUT event trigger. By disabling the REVALIDATION_TIMEOUT, the revalidation time value previously provided to PCEF 160 is not applicable.

Rules 166 may have respective statuses of "active" or "inactive" that determine whether the rule is to be enforced or not be enforced, respectively. PCRF 150 may control at what time the status of a rule of rules 166 changes. For instance, if a rule activation time ("Rule-Activation-Time"), which determines a time at which a rule is to be activated, is specified only and has not yet occurred, then PCEF 160 shall set the rule inactive and make it active at that time. If Rule-Activation-Time has passed, then PCEF 160 shall immediately set the rule active. If a rule deactivation time ("Rule-Deactivation-Time"), which determines a time at which a rule is to be deactivated (i.e., rendered inactive), is specified only and has not yet occurred, then PCEF 160 shall set the rule active and make it inactive at the rule deactivation time. If Rule-Deactivation-Time has passed, then PCEF 160 shall immediately set the rule inactive.

If both Rule-Activation-Time and Rule-Deactivation-Time are specified, and the Rule-Activation-Time occurs before the Rule-Deactivation-Time, and also when the rule is provided before or at the time specified in the Rule-Deactivation-Time, PCEF 160 shall handle the rule as defined above in the previous paragraph. If both Rule-Activation-Time and Rule-Deactivation-Time are specified, and the Rule-Deactivation-Time occurs before the Rule-Activation-Time, and also when the rule is provided before or at the time specified in the Rule-Activation-Time, PCEF 160 shall handle the rule as defined above in the previous paragraph. That is, if the rule is already active in mid-session, PCEF 160 will continue to enforce the active rule until the specified deactivation time, at which time PCEF 160 deactivates the rule. At the specified activation time, PCEF 160 reactivates the rule. However, 3GPP TS 29.212 does not specify whether PCEF 160 should continue usage monitoring for the rule after it is reactivated. Further, even if usage monitoring is to continue after reactivation, the 3GPP TS 29.212 does not specify the quota values (e.g., granted service units) that the PCEF 160 is to use in conjunction with the usage monitoring. Because the rule was previously active, a previously granted quota may be partially or completely depleted/consumed.

If both Rule-Activation-Time and Rule-Deactivation-Time are specified but time has already occurred for both, and the Rule-Activation-Time occurs before the Rule-Deactivation-Time, then PCEF 160 shall immediately set the rule inactive. If both Rule-Activation-Time and Rule-Deactivation-Time are specified but time has passed for both, and the Rule-Deactivation-Time occurs before the Rule-Activation-Time, then PCEF 160 shall immediately set the rule active.

According to 3GPP 29.212, rule activation or deactivation will not generate any Credit-Control-Request (CCR) commands with Charging-Rule-Report since PCRF 150 is already aware of the state of the rules. If Rule-Activation-Time or Rule-Deactivation-Time is specified in the Charging-Rule-Install then it will replace the previously set values for the specified rules. If Rule-Activation-Time AVP, Rule-Deactivation-Time AVP or both AVPs are omitted, then any previous value for the omitted AVP is no longer valid.

According to 3GPP 29.212, the rules including Rule-Activation-Time and Rule-Deactivation-Time shall not be applied for changes of the QoS or service data flow filter information. PCRF 150 may modify a currently installed rule, including setting, modifying or clearing its deferred activation and/or deactivation time. When modifying a dynamic rule with a prior and/or new deferred activation and/or deactivation time, PCRF 150 shall provide all attributes of that rule in the Charging-Rule-Definition AVP, including attributes that have not changed. In this case, PCRF 150 omission of an attribute that has a prior value will erase that attribute from the rule.

PCRF 150 may indicate, via the Gx reference point, the need to apply monitoring control for the accumulated usage of network resources on an IP-CAN session basis. Usage is defined as volume or time of user plane traffic. Monitoring for traffic volume and traffic time can be performed in parallel. The data collection for usage monitoring control shall be performed per monitoring key, which may apply for a single service data flow, a set of service data flows or for all the traffic in IP-CAN session 170, each of which is represented in FIG. 2 for rule 166A as traffic 180. If the usage monitoring of an IP-CAN session level is enabled, PCRF 150 may request PCEF 160 to exclude a single service data flow or a set of service data flows from the usage monitoring of IP-CAN session 170 level.

If PCRF 150 requests usage monitoring control and if at this time, PCRF 150 is not subscribed to the "USAGE_REPORT" Event-Trigger, PCRF 150 may include the Event-Trigger AVP, set to the value "USAGE_REPORT", in a CC-Answer or RA-Request. PCRF 150 may not remove the "USAGE_REPORT" Event-Trigger AVP while usage monitoring is still active in PCEF 160.

At IP-CAN session establishment and modification, PCRF 150 may provide the applicable thresholds, volume threshold, time threshold or both volume threshold and time threshold, for usage monitoring control to PCEF 160, together with the respective monitoring keys. To provide the initial threshold for one or more monitoring key(s), PCRF 150 may include the threshold in either RA-Request or in the response of a CC-Request initiated by PCEF 160.

During IP-CAN session 170 establishment, PCRF 150 may receive information about total allowed usage per PDN and User Equipment (UE) from the Subscription Profile Repository (SPR), i.e. the overall amount of allowed traffic volume and/or time of usage that are to be monitored per PDN and UE and/or total allowed usage for monitoring key(s) per PDN and UE.

In order to provide the applicable threshold for usage monitoring control, PCRF 150 may include a Usage-Monitoring-Information AVP per monitoring key. The threshold level may be provided in its Granted-Service-Unit AVP. Threshold levels may be defined for the total volume only, the uplink volume only, the downlink volume only, the uplink and downlink volume, or the time. The threshold level may alternatively be referred to herein as a "quota" or "granted service unit," for instance.

PCRF 150 may provide the applicable volume threshold (s) in the CC-Total-Octets, CC-Input-Octets or CC-Output-Octets AVPs and/or time threshold in the CC-Time AVP of the Granted-Service-Unit AVP. The monitoring key may be provided in the Monitoring-Key AVP. PCRF 150 may provide multiple usage monitoring control instances. PCRF 150 may indicate if the usage monitoring instance applies to the IP-CAN session or to one or more rules 166. For this purpose, the Usage-Monitoring-Level AVP may be provided with a value respectively set to SESSION_LEVEL or PCC_RULE_LEVEL. PCRF 150 may provide one usage monitoring control instance applicable at IP-CAN session level and one or more usage monitoring instances applicable at the level of rules 166. In the example of FIG. 2, usage monitor 168 represents a usage monitoring control instance. A single usage monitor 168 is illustrated for ease of illustration and descriptive purposes. Usage monitoring module 164 may include many additional instances of usage monitor 168 at either the rule level or the session level.

Usage monitor 168 of usage monitoring module 164 monitors traffic 180 that matches monitoring key 171 for rule 166A and tracks the accumulated usage 172 (illustrated as "acc. usage 172") of the traffic 180 against the granted service units (GSU) 170. For example, if granted service units are expressed in minutes and GSU 170 is 240 minutes, accumulated usage 172 may be any value between 0 and 240 minutes indicating a usage of traffic 180 with respect to monitoring key 171. If granted service units are expressed in octets (typically bytes) and GSU 170 is 64 MB, for instance, accumulate usage 172 may be any value between 0 and 64 MB.

PCRF 150 may provide a Monitoring-Time AVP to PCEF 160 for the monitoring keys(s) in order to receive reports for the accumulated usage before and after the monitoring time occurs. In such a case, there may be two instances of Granted-Service-Unit AVP within Usage-Monitoring-Information AVP per monitoring key. One instance may indicate the threshold levels before the monitoring time occurs, and the other instance, which includes Monitoring-Time AVP, may indicate the subsequent threshold levels after the monitoring time occurs.

To modify the threshold level for one or more monitoring keys, PCRF 150 may provide the thresholds for all the different levels applicable to the corresponding monitoring key(s). To modify the monitoring key for the session level usage monitoring instance, PCRF 150 may disable the existing session level monitoring usage instance and shall provide a new session level usage monitoring instance following the procedures defined in this clause. PCRF 150 may enable the new session level usage monitoring instance and disable the existing session level usage monitoring instance in the same command.

According to 3GPP 29.212, when the accumulated usage is reported in a CCR command, PCRF 150 shall indicate to PCEF 160 if usage monitoring shall continue for that IP-CAN session, usage monitoring key, or both. For instance, if monitoring shall continue for specific level(s), PCRF 150 may provide the new thresholds for the level(s)

in the CC-Answer using the same AVP as before (CC-Total-Octets, CC-Input-Octets, CC-Output-Octets AVP or CC-Time AVP within the Granted-Service-Unit AVP). Otherwise, if PCRF 150 wishes to stop monitoring for specific level(s), PCRF 150 shall not include an updated threshold in the CCA command for the stopped level(s), i.e., the corresponding CC-Total-Octets, CC-Input-Octets, CC-Output-Octets or CC-Time AVPs shall not be included within Granted-Service-Units AVP.

According to 3GPP 29.212, if both volume and time thresholds were provided and the threshold for one of the measurements is reached, PCEF 160 shall report this event to PCRF 150 and the accumulated usage since last report shall be reported for both measurements. When usage monitoring is enabled, PCRF 150 may request PCEF 160 to report accumulated usage for one or more enabled monitoring keys regardless if a usage threshold has been reached by sending to PCEF 160 within the Usage-Monitoring-Information AVP the Usage-Monitoring-Report AVP set to the value USAGE_MONITORING_REPORT_REQUIRED. PCRF 150 shall only require PCEF to report accumulated usage for one or more monitoring keys in a CC-Answer when PCEF 160 has not provided accumulated usage in the CC-Request for the same monitoring key(s).

To specify the usage monitoring key for which usage is requested PCRF 150 shall include the usage monitoring key within the Monitoring-Key AVP within the Usage-Monitoring-Information AVP. To request usage be reported for all enabled usage monitoring keys PCRF 150 shall omit the Monitoring-Key. PCRF 150 shall process the usage reports and shall perform the actions as appropriate for each report.

When usage monitoring is enabled, PCEF 160 shall measure the volume and/or the time of usage of the IP-CAN session or the volume and/or the time of usage of the applicable service data flows. PCEF 160 shall be able to support volume and time measurements simultaneously for a given IP-CAN session or service data flows. If the PCC rule is installed or updated with the Monitoring-Flags AVP with the bit 0 set, PCEF 160 shall not include the corresponding service data flow in the volume and/or time measurement on IP-CAN session level.

According to 3GPP 29.212, PCEF 160 reports accumulated usage to PCRF 150 in the following conditions: when a usage threshold is reached, when all rules for which usage monitoring is enabled for a particular usage monitoring key are removed or deactivated, when usage monitoring is explicitly disabled by PCRF 150, when an IP-CAN session is terminated, or when requested by PCRF 150. In accordance with techniques described herein, PCEF 160 reports accumulated usage to PCRF 150 when an active rule is deactivated as a result of a deactivation time specified by PCRF 150 for the rule. That is, PCEF 160 reports the accumulated usage determined by PCEF 160 for the rule up to the time the rule is rendered inactive.

According to 3GPP 29.212, to report accumulated usage for a specific monitoring key, PCEF 160 may send to PCRF 150 a CC-Request with the Usage-Monitoring-Information AVP including the accumulated usage since the last report. For each of the enabled monitoring keys to be reported, the Usage-Monitoring-Information AVP shall include the monitoring key in the Monitoring-Key AVP and the accumulated volume usage in the Used-Service-Unit AVP along with the newly proposed Reporting reason AVP. Accumulated volume reporting shall be done for the total volume, the uplink volume or the downlink volume as requested by PCRF 150, and set in CC-Total-Octets, CC-Input-Octets or CC-Output-Octets AVPs of Used-Service-Unit AVP respectively. Accumulated time reporting may be set in the CC-Time AVP of Used-Service-Unit AVP. PCEF 160 may continue to perform volume and/or time measurement after the report until instructed by PCRF 150 to stop the monitoring. If both volume and time measurements are requested by PCRF 150 and the threshold for one of the measurements is reached, PCEF 160 may report this event to PCRF 150 and the accumulated usage since last report may be reported for both measurements.

In accordance with techniques described herein, in response to deactivating active rule 166A at a specified deactivation time for rule 166A, PCEF 160 reports accumulated usage 172 up to the deactivation time using usage reporting message 182, which specifies the accumulated usage 172 and also indicates the reason the accumulated usage is being reported as due to a time of day trigger, e.g., due to deactivation as a result of the specified deactivation time. As a result, the PCRF 150 may be informed that rule 166A is inactive and also of the accumulated usage 172 against the monitoring key 171 for rule 166A up to the deactivation time. As described in further detail herein, reporting the reason for the accumulated usage reporting as due to deactivation as specified by a deactivation time for rule 166A may allow the PCRF 150 to avoid specifying whether usage monitoring shall continue in additional messages to PCEF 160. Usage reporting message 182 may include a Used-Service-Unit AVP that includes a reporting-reason AVP that identifies the reason the accumulated usage is being reported as due to a time of day trigger. Usage reporting message 182 may represent a CC-Request with the Usage-Monitoring-Information AVP that includes the Used-Service-Unit AVP just described.

In addition to sending usage reporting message 182 in response to deactivating the rule 166A, in accordance with techniques of this disclosure, PCEF 160 determines a difference between granted service units 170 and accumulated usage 172 at the deactivation time. If the difference is positive (i.e., GSU 170 is greater than accumulated usage 172), the difference is a number of unused service units 174 ("unused SU 174") at the deactivation time for the monitoring key 171. Rather than deleting the usage monitor 168 instance, PCEF 160 may mark usage monitor 168 and stored the value for unused service units 174 for later use, as described below. If the difference is not positive (i.e., zero or negative), the GSU 170 has been completely consumed, and PCEF 160 may delete usage monitor 160. PCEF 160 may further report to PCRF 150 that GSU 170 has been completely consumed.

According to 3GPP 29.212, in the case where a Monitoring-Time AVP was provided by PCRF 150 within one instance of the Granted-Service-Unit AVP included within the Usage-Monitoring-Information AVP for the usage monitoring control request, PCEF 160 shall report the Usage-Monitoring-Information AVP. For cases where PCRF 150 indicates in a CC-Answer command whether the usage monitoring shall continue as a response to the reporting of accumulated usage in a CCR command, PCEF 160 shall behave as follows: if PCRF 150 provisions an updated usage threshold in the CCA command, the monitoring continues using the updated threshold value provisioned by PCRF 150. Otherwise, if PCRF 150 does not include an updated usage threshold in the CCA command, PCEF 160 shall not continue usage monitoring for that IP-CAN session, usage monitoring key, or both as applicable. When PCRF 150 indicates that usage monitoring shall not continue in the CCA, PCEF 160 does not report usage which has accumulated between sending the CCR and receiving the CCA.

According to 3GPP 29.212, upon receiving the reported usage from PCEF 160, PCRF 150 shall deduct the value of the usage report from the total allowed usage for that IP-CAN session, usage monitoring key, or both as applicable, and PCRF 150 may also derive the PCC rules based on the remaining allowed usage or reported usage and provision them to PCEF 160.

After deactivating rule 166A at a specified deactivation time and sending the usage reporting message 182, PCEF 160 may subsequently activate the inactive rule 166A at a specified activation time and begin monitoring traffic 180 again against monitoring key 171. Because monitoring key 171 has remaining granted service units the value for which is stored as unused service unit 174, PCEF sets GSU 170 to the value of unused service units 174 and monitors traffic 180 until the new value of GSU 170 is exhausted.

The data collection for usage monitoring control can be performed per monitoring key, which may apply to one flow/application (i.e. the monitoring key is used by a single policy rule 166A as in the above example monitoring key 171), or to several flows/applications (i.e., the monitoring key is used by many policy rules 166), or all detected traffic belonging to a specific subscriber session. Each usage monitoring instance 168 includes a have a quota (e.g., GSU 170) assigned by a policy control server through a granted service unit attribute-value pair (AVP), where the quota is defined as volume and/or time of user plane traffic. Usage monitor 168 monitors the flow(s) against the monitoring key until the data flow exhausts the granted service units 170 and report the usage to PCRF 150.

In some cases, PCRF 150 installs a rule without a corresponding activation and deactivation time, and usage monitor 168 activates the rule immediately. PCRF 150 can update the rule with activation and deactivation time in mid-session such that the deactivation time is lower than the activation time. In this case usage monitor 168 will disable (inactive only but not delete) the rule at the deactivation time and reactivate the rule at the activation time.

In accordance with techniques of this this disclosure, PCRF 150 installs a rule 166A without activation/deactivation time AVPs and usage monitoring module 164 activates the rule 166A immediately. PCRF 150 can update the rule 166A with activation and deactivation time in mid-session such that the deactivation time is lower than the activation time. In this case usage monitor 168 will disable (inactivate only but not delete) the rule at the deactivation time and reactivate the rule at the activation time.

In the above scenario, a rule which is being monitored by a usage monitoring object goes inactive because of a Time of Day (ToD) trigger. Proposed solution is to report the usage that is accumulated up to the deactivation time to PCRF 150 and mark the usage monitoring object (e.g. usage monitor 168) also as inactive along with the rule, provided the accumulated usage 172 is less than granted service units 170. Usage monitor 168 then recalculates the quota as unused service units 174 by deducting accumulated usage 172 from granted service units 170 at the time of installation. If accumulated usage 172 is greater than or equal to the granted quota, then the usage monitor 168 will be deleted from usage monitor 168 because PCEF 160 cannot monitor a flow without a non-zero quota as the quota is exhausted already.

During the rule re-activation (ToD triggered at activation time) then usage monitor 168 is activated along with the rule 166A and is installed with granted service unit 170 set to the previously-determined unused service units 174, determined as described above. As a result, PCRF 150 does not need to initiate an update message towards usage monitoring module 164 simply to enable monitoring for the rule 166A that is getting activated via ToD trigger on usage monitoring module 164. The techniques may in this way reduce the number of PCEF 160-PCRF 150 mid-session interactions.

In the current disclosure, the usage monitoring deactivation time is based on a time of day deactivation syntax. Further, the monitoring device reactivates the usage monitoring based on a time of day activation syntax. The time of day deactivation syntax and the time of day activation syntax may include a reason (being a time of day deactivation/activation), a reporting period, a requested time, a requested amount of octets to be sent, a requested amount of octets to be received, a requested amount of service specific units, and a timestamp, as further described with respect to FIG. 3. In some examples, usage monitoring module 164 may send data indicating the policy rule is deactivated to PCRF 150. The data may specify the amount of unused granted service units for packet flow 180. In accordance with the techniques described herein, the reason for the usage monitoring deactivation time is a time of day deactivation.

At a usage monitoring activation time for rule 166A, usage monitoring module 164 may reactivate usage monitor 168 for packet flow 180 based on an updated amount of granted service units. For example, if accumulated usage 170 is less than granted service units 172, usage monitoring module 164 may reactivate usage monitor 168 and update granted service units 170 to equal the amount of unused granted service units calculated above.

Conversely, responsive to the amount of unused granted service units being equal to zero, usage monitoring module 164 may delete usage monitor 168. In such examples, usage monitoring module 164 may request a new granted service unit amount from PCRF 150. Upon requesting the new granted service unit amount, PCRF 150 may issue additional service units to PCEF 160. If granted, usage monitoring module 164 may reinstate usage monitor 168 for packet flow 180 with the additional service units.

In further accordance with the techniques of this disclosure, rule module 154 of PCRF 150 may receive, from PCEF 160, a time of day deactivation indication. Rule module 154 may further receive, from PCEF 160, data indicating an amount of used service units for packet flow 180 against monitoring key 171 that is used at the expiry of a usage monitoring deactivation time for packet flow 180. Rule module 154 may further receive, from PCEF 160, data indicating that reason for PCEF 160 reporting the amount of used service units is a deactivation of rule 166A due to a specified deactivation time for rule 166A.

The techniques described herein may provide one or more advantages. For example, by automatically reactivating a deactivated usage monitoring using a stored remaining service units for the at least one packet flow, the monitoring device (PCEF 160 in the example of FIG. 2) may avoid a requirement that the policy control server device (PCRF 150 in the example of FIG. 2) reinitiate usage monitoring. At least in some instances, because the monitoring device uses the stored remaining/unused service units for the reactivated usage monitoring, the subsequent usage is commensurate with the expected service units that would otherwise be initiated by the policy control server device. As a result, the techniques may reduce an amount of control traffic between the policy control server device and the monitoring device for usage monitoring of packet flows.

Figure 3:
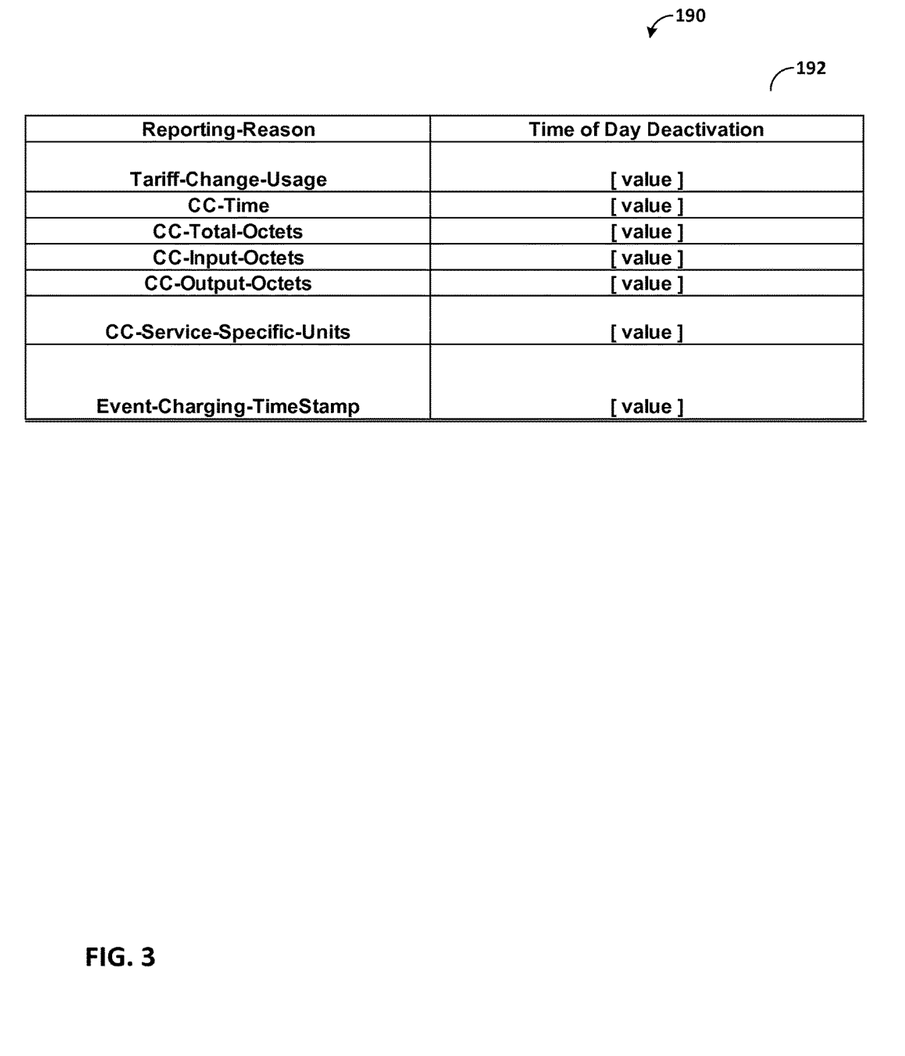
FIG. 3 is a table that represents an example set of attribute value pairs (AVPs) for reporting used service units in a usage reporting message, extended according to techniques described in this disclosure.

FIG. 3 is a table that represents an example set of attribute value pairs (AVPs) for reporting used service units in a usage reporting message, extended according to techniques described in this disclosure. Usage reporting message 190 may represent an example portion of usage reporting message 182 of FIG. 2. Usage reporting message 190 may represent a Used-Service-Unit AVP. Usage reporting message 190 includes reporting-reason AVP 192 having a value that indicates the reason for the usage reporting message 190 is "Time of Day Deactivation," e.g., deactivation of a rule at a specified deactivation time in accordance with time of day operations. As described herein, reporting the reason for the accumulated usage reporting as due to deactivation as specified by a deactivation time for rule 166A may allow the PCRF 150 to avoid specifying whether usage monitoring shall continue in additional messages to PCEF 160.

While the techniques of this disclosure are used to describe usage monitoring after a time of day deactivation, there may be other reporting reasons that affect usage monitoring. Such reporting reasons include that the usage monitor was disabled, that a report was requested from a PCRF, that a usage threshold was reached, or that the usage monitor was disabled due to all PCC rules being deleted.

Figure 4:
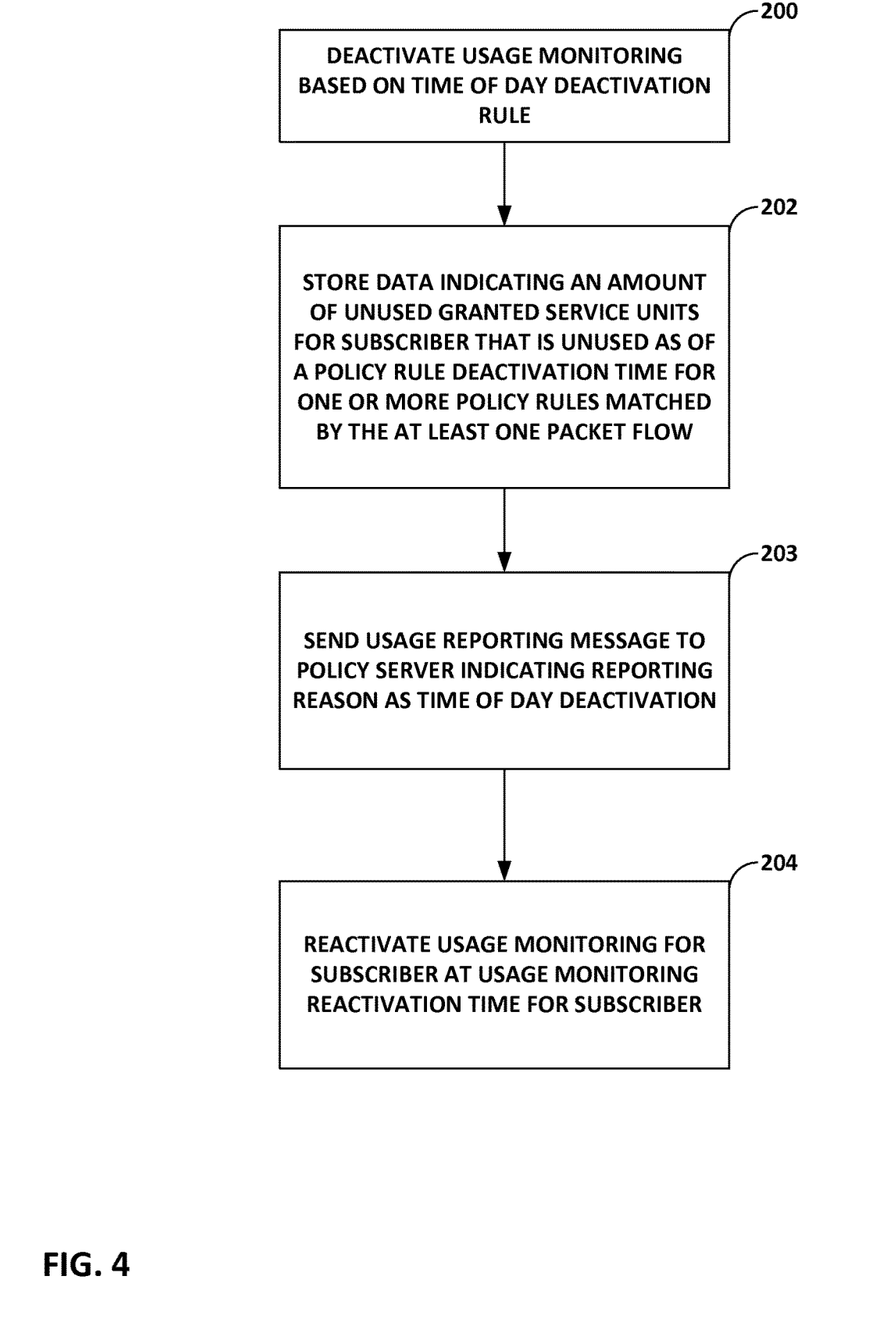
FIG. 4 is a flow diagram illustrating a usage monitoring technique performed by a usage monitoring device, in accordance with one or more techniques of the current disclosure.

FIG. 4 is a flow diagram illustrating a usage monitoring technique performed by a usage monitoring device, in accordance with one or more techniques of the current disclosure. For the purposes of this example, reference will be made to devices and structures of FIG. 2. A usage monitoring module (e.g., usage monitoring module 164 of PCEF 150) may deactivate usage monitoring for an active rule based on a time of day deactivation (200). PCEF 150 performs usage monitoring for at least one packet flow (e.g., packet flow 180) that traverses an access network by which subscriber devices access a packet data network. Upon deactivating the rule, usage monitoring module 164 may store data indicating an amount of unused granted service units for packet flow 180 that is unused at a usage monitoring deactivation time for packet flow 180 (202). PCEF 160 reports accumulated usage 172 using usage reporting message 182, which specifies the accumulated usage 172 and also indicates the reason the accumulated usage is being reported as due to a time of day trigger, e.g., due to deactivation as a result of the specified deactivation time (203). Usage monitoring module 164 may further reactivate the usage monitoring for packet flow 180 at a usage monitoring reactivation time for packet flow 180, with the number granted service units for the reactivated usage monitoring being set to the amount of unused granted service units stored at step 202 (204).

Figure 5:
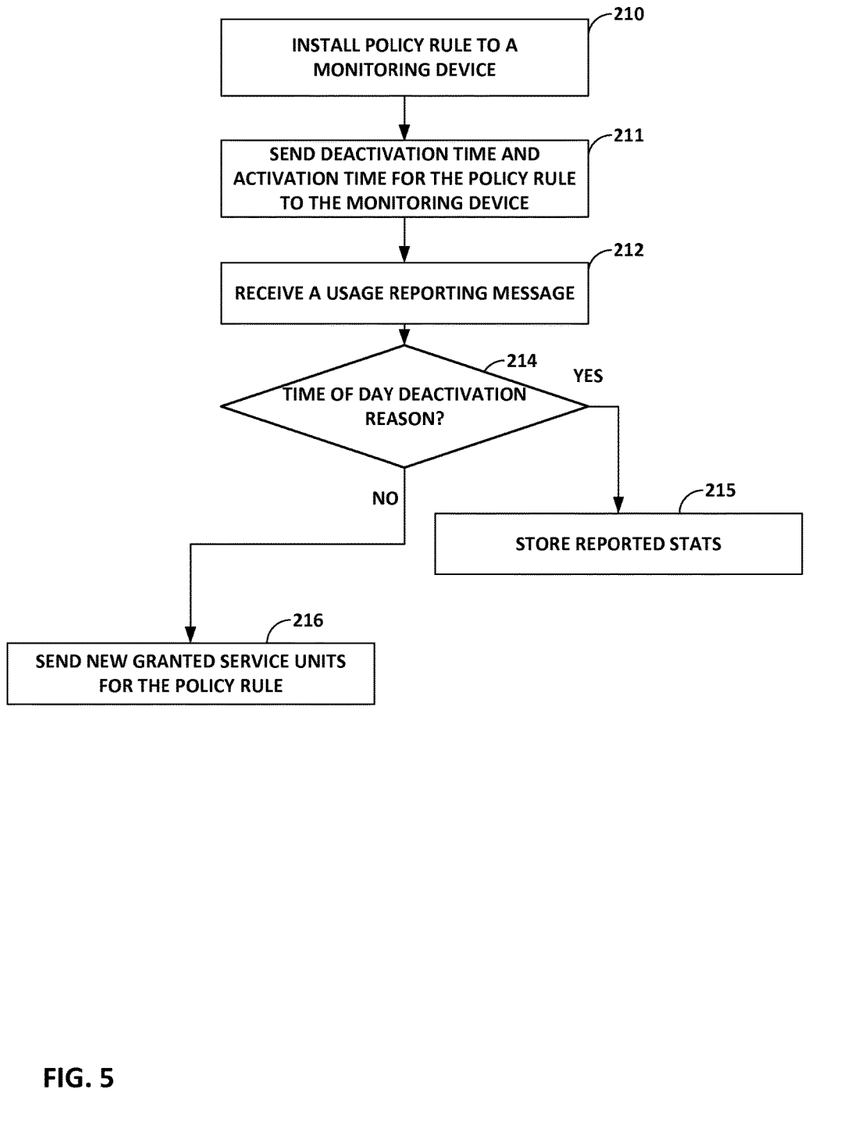
FIG. 5 is a flow diagram illustrating a usage monitoring technique performed by a policy server, in accordance with one or more techniques of the current disclosure.

FIG. 5 is a flow diagram illustrating a usage monitoring technique performed by a policy server, in accordance with one or more techniques of the current disclosure. For the purposes of this example, reference will be made to devices and structures of FIG. 2. In accordance with the techniques of this disclosure, rule module 154 of PCRF 150 may install a PCC, ADC, or other policy rule to PCEF 160 (210), which activates the policy rule and being monitoring usage for service data flows for the policy rule according to a number of granted service units. Subsequently, rule module 154 sends the PCEF 160 a deactivation time and activation time for the now active policy rule, where the deactivation time is earlier than the activation time (211).

The rule module 154 receives a usage reporting message 182 that includes data indicating the reason for the usage reporting message (212). If the reason indicated is time of day deactivation of the policy rule at the deactivation time (YES branch of 214), then rule module 154 may wait for a subsequent usage reporting message and store the reported statistics in usage reporting message 182 (215). Rule module 154 may then send new granted service units for the policy rule (216), e.g., in an update message for the policy rule, to reactivate the policy rule. Otherwise (NO branch of 214), rule module 154 may just send new granted service units for the policy rule (216).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   deactivating, by a monitoring device that performs usage monitoring for at least one packet flow that traverses an access network by which subscriber devices access a packet data network, one or more policy rules matched by the at least one packet flow at a policy rule deactivation time;
   storing, by the monitoring device, data indicating an amount of unused granted service units for the at least one packet flow that is unused as of the policy rule deactivation time;
   determining, by the monitoring device, an updated amount of granted service units using the stored data indicating the amount of unused granted service units as of the policy rule deactivation time;

in response to determining the updated amount of unused granted service units is less than or equal to zero, deleting, by the monitoring device, a usage monitor instance that performs the usage monitoring by monitoring the at least one packet flow against a monitoring key;

in response to determining that the updated amount of granted service units is greater than zero, reactivating, by the monitoring device, the usage monitoring for the at least one packet flow at a policy rule reactivation time for the one or more policy rules matched by the at least one packet flow based on the updated amount of granted service units, wherein the policy rule reactivation time is later than the policy rule deactivation time; and receiving, by the monitoring device from a policy control rules function (PCRF) server device, a policy rule of the one or more policy rules, wherein the at least one packet flow comprises at least one service data flow for the policy rule.

2. The method of claim 1, further comprising:
sending, by the monitoring device to a policy server, data indicating a rule is deactivated, the data specifying an amount of used granted service units for the at least one packet flow that have been used at the policy rule deactivation time and the data further specifying a reporting reason for the rule being deactivated is a time of day rule deactivation.

3. The method of claim 1, wherein the policy rule deactivation time is based on a policy rule time of day deactivation syntax, and wherein the monitoring device reactivates the one or more policy rules based on a policy rule time of day activation syntax.

4. The method of claim 1, further comprising:
receiving, by the monitoring device from a policy server, the policy rule deactivation time due to the policy rule deactivation and the policy rule activation time for an active policy rule, wherein the policy rule deactivation time is earlier than policy rule activation time; and determining, by the monitoring device, the amount of unused granted service units for the at least one packet flow that is unused at the usage monitoring deactivation time due to the policy rule deactivation.

5. The method of claim 1, wherein the policy rule comprises one of an application detection and control (ADC) rule and a policy and charging control (PCC) rule.

6. The method of claim 1, wherein the monitoring device comprises at least one of a Traffic Detection Function (TDF) device and a Policy and Charging Enforcement Function (PCEF) device.

7. The method of claim 1, wherein reactivating the usage monitoring comprises reactivating, by the monitoring device, the usage monitoring only if an amount of unused granted service units is positive.

8. The method of claim 1, further comprising:
installing, by a policy server to the monitoring device, a policy rule of the one or more policy rules for monitoring the usage of the granted service units by the at least one packet flow that traverses the access network within a policy domain of the policy server and by which the subscriber devices access the packet data network;

receiving, by the policy server from the monitoring device, a first usage reporting message;

waiting, by the policy server in response to determining the first usage reporting message indicates a reason for the first usage reporting message as time of day deactivation of the policy rule, for a second, subsequent usage reporting message from the monitoring device;

sending, by the policy server to the monitoring device in response to receiving the second usage reporting message, additional granted service units for the monitoring usage of granted service units usage by the at least one packet flow.

9. The method of claim 8, further comprising:
sending, by the policy server to the monitoring device, an update message to reactivate the policy rule, wherein the update message specifies the additional granted service units.

10. A monitoring device comprising:
a control unit comprising a processor;
one or more policy rules matched by at least one packet flow that traverses an access network by which subscriber devices access a packet data network; and
a usage monitoring module executed by the control unit and configured to:
perform usage monitoring for the at least one packet flow;
deactivate one or more policy rules matched by the at least one packet flow at a policy rule deactivation time;
store data indicating an amount of unused granted service units for the at least one packet flow that is unused as of the policy rule deactivation time;
determine an updated amount of granted service units using the stored data indicating the amount of unused granted service units as of the policy rule deactivation time;
in response to determining the updated amount of unused granted service units is less than or equal to zero, delete a usage monitor instance that performs the usage monitoring by monitoring the at least one packet flow against a monitoring key;
in response to determining that the updated amount of granted service units is greater than zero, reactivate the usage monitoring for the at least one packet flow at a policy rule reactivation time for the one or more policy rules matched by the at least one packet flow based on the updated amount of granted service units, wherein the policy rule reactivation time is later than the policy rule deactivation time; and
receive, from a policy control rules function (PCRF) server device, a policy rule of the one ore more policy rules, wherein the at least one packet flow comprises at least one service data flow for the policy rule.

11. The monitoring device of claim 10,
wherein the usage monitoring module is further configured to:
send, to a policy server, data indicating a rule is deactivated, the data specifying an amount of used granted service units for the at least one packet flow that have been used at the policy rule deactivation time and the data further specifying a reporting reason for the rule being deactivated is a time of day rule deactivation.

12. The monitoring device of claim 10, wherein the policy rule deactivation time is based on a policy rule time of day deactivation syntax, and wherein the monitoring module is further configured to reactivate the one or more policy rules based on a policy rule time of day activation syntax.

13. The monitoring device of claim 10, wherein the usage monitoring module is further configured to:
receive, from a policy server, the policy rule deactivation time due to the policy rule deactivation and the policy rule activation time for an active policy rule, wherein the policy rule deactivation time is earner than policy rule activation time; and determine the amount of unused granted service units for the at least one packet flow that is unused at the usage monitoring deactivation time due to the policy rule deactivation.

14. The monitoring device of claim 10, wherein the policy rule comprises one of an application detection and control (ADC) rule and a policy and charging control (PCC) rule.

15. The monitoring device of claim 10, wherein the monitoring device comprises at least one of a Traffic Detection Function (TDF) device and a Policy and Charging Enforcement Function (PCEF) device.

16. The monitoring device of claim 10, wherein to reactivate the usage monitoring the usage monitoring module is configured to reactivate the usage monitoring only if an amount of unused granted service units is positive.

17. A system comprising:
a monitoring device comprising:
a first control unit comprising a first processor;
one or more policy rules matched by at least one packet flow that traverses an access network by which subscriber devices access a packet data network; and
a usage monitoring module executed by the control unit and configured to:
perform usage monitoring for the at least one packet flow; deactivate one or more policy rules matched by the at least one packet flow at a policy rule deactivation time;
store data indicating an amount of unused granted service units for the at least one packet flow that is unused as of the policy rule deactivation time;
determine an updated amount of granted service units using the stored data indicating the amount of unused granted service units as of the policy rule deactivation time;
in response to determining the updated amount of unused granted service units is less than or equal to zero, delete a usage monitor instance that performs the usage monitoring by monitoring the at least one packet flow against a monitoring key;
in response to determining that the updated amount of granted service units is greater than zero, reactivate the usage monitoring for the at least one packet flow at a policy rule reactivation time for the one or more policy rules matched by the at least one packet flow based on the updated amount of granted service units, wherein the policy rule reactivation time is later than the policy rule deactivation time; and
receive, from a policy control rules function (PCRF) server device, a policy rule of the one or more policy rules, wherein the at least one packet flow comprises at least one service data flow for the policy rule;
a policy server comprising:
a second control unit comprising a second processor;
a rule module executed by the control unit and configured to:
install, to the monitoring device, a policy rule of the one or more policy rules for monitoring the usage of the granted service units by the at least one packet flow that traverses the access network within a policy domain of the policy server and by which the subscriber devices access the packet data network;
receive, from the monitoring device, a first usage reporting message;
wait; in response to determining the first usage reporting message indicates a reason for the first usage reporting message as time of day deactivation of the policy rule, for a second, subsequent usage reporting message from the monitoring device; and
send, to the monitoring device in response to receiving the second usage reporting message, additional granted service units for the monitoring usage of granted service units usage by the at least one packet flow.

18. A non-transitory computer-readable storage medium comprising instructions that cause one or more processors of a monitoring device to:
perform usage monitoring for the at least one packet flow;
deactivate one or more policy rules matched by the at least one packet flow at a policy rule deactivation time;
store data indicating an amount of unused granted service units for the at least one packet flow that is unused as of the policy rule deactivation time;
determine an updated amount of granted service units using the stored data indicating the amount of unused granted service units as of the policy rule deactivation time;
in response to determining the updated amount of unused granted service units is less than or equal to zero, delete a usage monitor instance that performs the usage monitoring by monitoring the at least one packet flow against a monitoring key; and
in response to determining that the updated amount of granted service units is greater than zero, reactivate the usage monitoring for the at least one packet flow at a policy rule reactivation time for the one or more policy rules matched by the at least one packet flow based on the updated amount of granted service units, wherein the policy rule reactivation time is later than the policy rule deactivation time; and
receive, from a policy control rules function (PCRF) server device, a policy rule of the one or more policy rules, wherein the at least one packet flow comprises at least one service data flow for the policy rule.

19. The non-transitory computer-readable storage medium of claim 18, wherein the policy rule deactivation time is based on a policy rule time of day deactivation syntax, and wherein the monitoring module is further configured to reactivate the one or more policy rules based on a policy rule time of day activation syntax.

20. The non-transitory computer-readable storage medium of claim 18,
receive, from a policy server, the policy rule deactivation time due to the policy rule deactivation and the policy rule activation time for an active policy rule, wherein the policy rule deactivation time is earlier than policy rule activation time; and
determine the amount of unused granted service units for the at least one packet flow that is unused at the usage monitoring deactivation time due to the policy rule deactivation.

* * * * *